Patented Oct. 21, 1952

2,615,020

UNITED STATES PATENT OFFICE 2,615,020

DERIVATIVES OF 2-THIO-6-AMINO-1,2,3,4-TETRAHYDRO-2,4-PYRIMIDINEDIONE

Viktor Papesch, Morton Grove, and Elmer F. Schroeder, Chicago, Ill., assignors to G. D. Searle & Co., Chicago, Ill., a corporation of Illinois No Drawing. Application February 1, 1950, Serial No. 141,836

9 Claims. (Cl. 260—256.5)

1

The present invention is concerned generally with poly-substituted heterocyclic compounds, and more particularly with alkyl and aralkyl substitution products of 2 - thio - 6 - amino - 1,2,3,4-tetrahydro-2,4-pyrimidinedione.

The compounds which comprise our invention have the following general structural formula

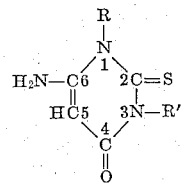

wherein the substituent radicals R and R′ represent a member of the group of alkyl and aralkyl radicals.

Among the radicals which R and R′ may represent are methyl, ethyl, normal and branched chain propyl, butyl, amyl and hexyl, benzyl, phenethyl and phenylpropyl. The two substituent radicals R and R′ may be identical or different.

The thioaminopyrimidinediones of this invention have been found to possess useful therapeutic properties, particularly in improving cardiovascular and renal function. Thus, the 1,3-diethyl - 2 - thio-6-amino-1,2,3,4-tetrahydro-2,4-pyrimidinedione, when tested in the rat for diuretic activity by the technique of Lipschitz (Journal of Pharmacology and Experimental Therapeutics, 79, 97, 1943), shows twice the activity of theophylline over a large dosage range. The beneficial effect on the heart is readily demonstrated in open chest experiments on the dog. Rotameter studies show such compounds to be comparable in activity to theophylline as coronary dilators in situ.

In the preparation of the compounds of this invention, we prefer the following general method of synthesis. The 1,3-dialkyl-thiourea is treated with one molecular equivalent of acetic anhydride, or preferably an excess thereof, and with one molecular equivalent or, preferably, with a 10–20% excess, of cyanoacetic acid. We find that a substantial saving in acetic anhydride can be effected by using glacial acetic acid as a solvent in the process. To produce the cyanoacetyl derivative of the disubstituted thiourea, we heat

2 at 45–80° centigrade for 10 minutes to 12 hours. However, we find it preferable to heat for about 15 minutes at a temperature no higher than 75° C. in order to prevent the formation of by-products. The 1,3 - dialkyl - 3 - cyanoacetylthiourea compounds are ring-closed and converted into the 1,3 - dialkyl - 2 - thio-6-amino-1,2,3,4-tetrahydro-2,4-pyrimidinediones by addition of alkali to bring the pH above 7, after which the reaction proceeds spontaneously. This description applies equally to those compounds in which one or two of the alkyl groups are replaced by an aralkyl group.

The examples which are given below illustrate in detail the compounds which comprise our invention and methods for their preparation. However, this invention is not to be construed as limited in spirit or in scope thereby. It will be clear to those skilled in the art that many modifications in materials and methods may be made without departing from the invention.

EXAMPLE 1

*1 - isopropyl - 2 - thio - 3 - methyl - 6 - amino-1,2,3,4-tetrahydro-2,4-pyrimidinedione*

51 grams of methyl isothiocyanate are dissolved in 300 milliliters of benzene. With rapid stirring and cooling the solution is treated over a period of 25 minutes with a cooled solution of 52.7 g. of isopropylamine in 200 ml. of benzene. The reaction is exothermic and the addition is conducted at such a rate that the temperature remains at 20–25° C. Stirring is continued for 30 minutes. The 1-isopropyl-3-methylthiourea crystallizes out. One cools, filters, washes with benzene and finally with petroleum ether. 91 g. of the urea derivative are obtained in white, hexagonal plates, melting at 98–100° C.

26.4 g. of this urea are dissolved in 75 ml. of acetic anhydride and treated with 20.5 g. cyanoacetic acid. On heating for 2 hours at 60° C. a very deep red color develops. If, instead, one heats for only 15 minutes at 75° C., a much lighter color is obtained. The solvent is removed under vacuum as far as practical. One then adds 60 ml. of water and resumes the distillation until 50 g. of a thick, red syrup are obtained, consisting mainly of 1-isopropyl-3-methyl-3-cyanoacetyl-thiourea.

40 g. of this syrup are mixed with 40 ml. of water and treated with 6 ml. of 70% sodium hydroxide. The alkali is suitably added in 1 ml. portions, to prevent heating. The syrup dissolves and, almost immediately thereafter, there is a precipitation of a yellowish solid. After standing for a half hour one dilutes with 50 ml. of water, filters, washes with water and dries. 34 g. of crude 1-isopropyl-2-thio-3-methyl-6-amino-1,2,3,4-tetrahydro-2,4-pyrimidinedione are thus obtained. Upon recrystallization from glacial acetic acid, colorless needless form, which melt at 247–8° C.

EXAMPLE 2

*1,3 - diethyl - 2 - thio - 6 - amino - 1,2,3,4 - tetrahydro-2,4-pyrimidienedione*

45 g. of 1,3-diethylthiourea are dissolved in 100 ml. of glacial acetic acid and 100 ml, of acetic anhydride. One then adds 33 g. of cyanoacetic acid and heats for 15 minutes at 60° C. By vacuum distillation at a vapor temperature of 40° C., most of the solvent is removed. When the distillation becomes rather slow, one adds 30 ml. of water and completes the distillation. The bath temperature should not exceed 60° C.

To the resulting thick syrup, consisting mainly of 1,3-diethyl-3-cyanoacetyl-thiourea, one adds enough 10% sodium hydroxide to neutralize and then a few additional drops of 70% sodium hydroxide. One stirs the solution which becomes hot. Crystals appear within a short time. One cools, filters and, after drying, obtains 45 g. of 1,3 - diethyl - 2 - thio - 6 - amino - 1,2,3,4 - tetrahydro-2,4-pyrimidinedione. To remove the yellowish color one recrystallizes from 1 liter of 20% ethanol, using charcoal as a decolorizing agent. The white crystals melt at 178–182° C.

EXAMPLE 3

*1 - n - propyl - 2 - thio - 3 - ethyl - 6 -amino - 1,2,3,4 - tetrahydro - 2,4 - pyrimidinedione*

30 g. of 1-n-propyl-3-ethyl-thiourea are dissolved in 75 ml. of acetic anhydride and treated with 20 g. of cyanoacetic acid. One heats for 20 minutes at 70 to 75° C. and vacuum distils to remove the solvent as far as convenient. Then one adds 100 ml. of water and resumes the distillation until a thick reddish yellow syrup is obtained, which consists mainly of 1-n-propyl-3-ethyl-3-cyanoacetyl-thiourea.

50 g. of this syrup are treated with slightly more than the necessary amount of 20% sodium hydroxide to make the solution alkaline to phenolphthalein paper. The alkali is added slowly so as to avoid excessive heat development. Crystallization occurs soon thereafter. The yellowish precipitate of 1 - n - propyl - 2 - thio - 3 - ethyl-6 - amino - 1,2,3,4 - tetrahydro - 2,4 - pyrimidinedione is filtered and washed with water and may be obtained in colorless form by recrystallization from dilute ethanol.

EXAMPLE 4

*1,3 - di - n - propyl - 2 - thio -6 - amino - 1,2,3,4-tetrahydro - 2,4 - pyrimidinedione*

27 g. of 1,3-di-n-propylthiourea are dissolved in 50 ml. of acetic anhydride and 50 ml. of acetic acid. To this solution one adds 17 g. of cyanoacetic acid and heats for 20 minutes at 55° C. Most of the solvent is then removed by vacuum distillation at a bath temperature of 50° C., 25 ml. of water are added and the distillation completed as far as practical.

The syrup of 1,3-di-n-propyl-3-cyanoacetyl-thiourea is brought to a pH of 10 by addition of 20% sodium hydroxide. One stirs until crystallization occurs, cools, filters and washes repeatedly with water. In order to obtain colorless crystals of 1,3-di-n-propyl-2-thio-6-amino-1,2,3,4 - tetrahydro-2,4-pyrimidinedione one recrystallizes from 20% ethanol.

EXAMPLE 5

*1,3 - di - isobutyl-2-thio-6-amino-1,2,3,4-tetrahydro-2,4-pryimidinedione.*

10g. of 1,3-di-isobutyl thiourea are dissolved in 20ml. of glacial acetic acid and 20 ml. of acetic anhydride. One then adds 5.7 g. of cyanoacetic acid, heats for 20 minutes at 60° C. and vacuum distils at a bath temperature of 50° C. until most of the solvent is removed. One adds 10 ml. of water and resumes distillation until the 1,3-di-isobutyl-3-cyanoacetyl-thiourea forms a thick, usually red, syrup.

To this thick syrup one adds enough 10% sodium hydroxide to bring the pH to 7 and then a further small quantity of 70% sodium hydroxide to raise the pH to about 10. The solution becomes rather hot and one stirs until the crystallization begins. One filters and washes repeatedly with water. The resultant crystals of 1,3-di-isobutyl-2-thio-6-amino - 1,2,3,4 - tetrahydro-2,4-pyrimidinedione are usually yellowish. To obtain clear crystals one recrystallizes from a large volume of dilute ethanol and uses charcoal as a clarifying agent.

EXAMPLE 6

*1 - benzyl - 2 - thio - 3-ethyl-1,2,3,4-tetrahydro-2,4-pyrimidinedione*

20 g. of 1-benzyl-3-ethyl-thiourea are dissolved in 40 ml. of glacial acetic acid and 40 ml. of acetic anhydride. One then adds 11.8 g. of cyanoacetic acid, heats for 15 minutes at 60° C. and vacuum distils at a bath temperature of 50° C. until most of the solvent is removed. 20 ml. of water are added and the distillation is resumed. A thick syrup is obtained which consists mainly of 1-benzyl-3-ethyl-3-cyanoacetyl-thiourea.

To this thick syrup one adds 20% sodium hydroxide to raise the pH to about 10. The solution becomes rather hot and one stirs until a precipitate begins to form. The yellow crystals of 1 - benzyl-2-thio-3-ethyl-1,2,3,4-tetrahydro-2,4-pyrimidinedione are filtered and washed repeatedly with water. White crystals may be obtained by crystallization from 50% ethanol using charcoal.

EXAMPLE 7

*1,3-dibenzyl - 2 - thio - 1,2,3,4-tetrahydro-2,4-pyrimidinedione*

50 g. of 1,3-dibenzyl-2-thiourea are dissolved in 80 ml. of acetic anhydride and treated with 21 g. of cyanoacetic acid. On heating for 30 minutes at 65° C. a red color develops. The solvent is removed by vacuum distillation at a vapor temperature of 55° C. as far as practical. One adds 75 ml. of water and resumes the distillation until a thick syrup is obtained, consisting principally of 1,3-dibenzyl - 3 - cyanoacetyl-thiourea.

75g. of this syrup are mixed with 7 ml. of water and gradually treated with 70% sodium hydroxide until the solution reaches a pH of approximately 10. The syrup dissolves and, after a short time, a precipitate forms. After standing for a half hour one dilutes with 100 ml. of water, filters, washes repeatedly with water and recrystallizes from 60% ethanol.

We claim:

1. A compound of the following general structural formula

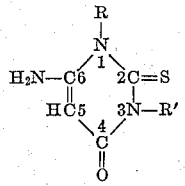

wherein the substituent radicals R and R' represent a member of the group consisting of alkyl and aralkyl radicals.

2. A compound of the following general structural formula

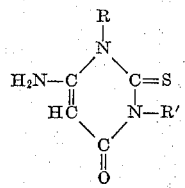

in which R and R' are alkyl groups.

3. A 1-alkyl-2-thio-3-ethyl-6-amino-1,2,3,4-tetrahydro-2,4-pyrimidinedione.

4. A compound of the following structural formula

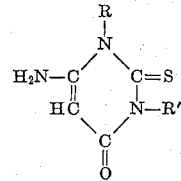

in which R and R' are aralkyl groups.

5. A 1-aralkyl-3-benzyl-2-thio-6-amino-1,2,3,4-tetrahydro-2,4-pyrimidinedione.

6. 1,3-dibenzyl-2-thio-6-amino-1,2,3,4-tetrahydro-2,4-pyrimidinedione.

7. A compound of the following general structural formula

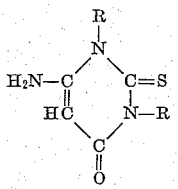

in which one of the R groups is alkyl and the other aralkyl.

8. A 1-aralkyl-3-alkyl-2-thio-6-amino-1,2,3,4-tetrahydro-2,4-pyrimidinedione.

9. A 1-benzyl-3-alkyl-2-thio-6-amino-1,2,3,4-tetrahydro-2,4-pyrimidinedione.

VIKTOR PAPESCH.
ELMER F. SCHROEDER.

REFERENCES CITED

The following references are of record in the file of this patent:

UNITED STATES PATENTS

| Number | Name | Date |
|---|---|---|
| 955,587 | Engelmann | Apr. 19, 1910 |

FOREIGN PATENTS

| Number | Country | Date |
|---|---|---|
| 156,055 | Germany | Mar. 14, 1903 |

OTHER REFERENCES

Traube, Ber. Deut. Chem. 33, 3041 (1900).
Elion et al., J. Am. Chem. Soc. 69, pp. 2131–2139 (1947).
Brobranski et al., J. Am. Pharm. Assn. 37, pp. 62–64 (1948).
Hackh, Chemical Dictionary (3rd ed.), p. 412.